(No Model.)

C. ACKER & G. MICHLER.
ROTARY BRUSH.

No. 327,851. Patented Oct. 6, 1885.

Attest:
Geo. L. Wheelock
V. A. Lewis

Inventor:
Conrad Acker
Gottlob Michler
By Knight Bros
attys

UNITED STATES PATENT OFFICE.

CONRAD ACKER AND GOTTLOB MICHLER, OF ST. LOUIS, MISSOURI.

ROTARY BRUSH.

SPECIFICATION forming part of Letters Patent No. 327,851, dated October 6, 1885.

Application filed November 10, 1884. Serial No. 147,571. (No model.)

*To all whom it may concern:*

Be it known that we, CONRAD ACKER and GOTTLOB MICHLER, both of the city of St. Louis, in the State of Missouri, have invented a certain new and useful Improvement in Rotary Brushes, of which the following is a full, clear, and exact description, reference being had to the accompanying drawings, forming part of this specification, and in which—

Figure 1:
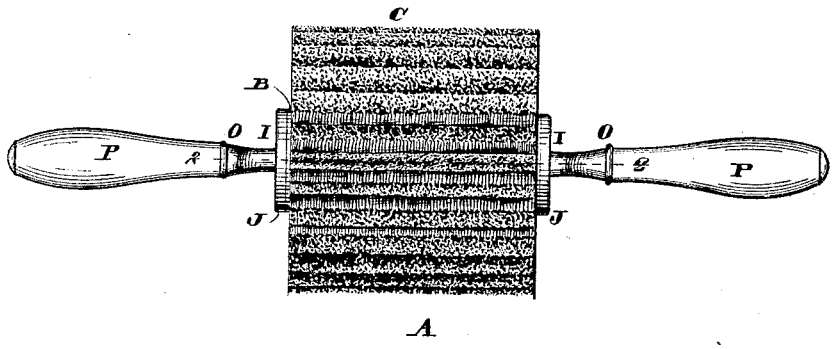
Figure 2:
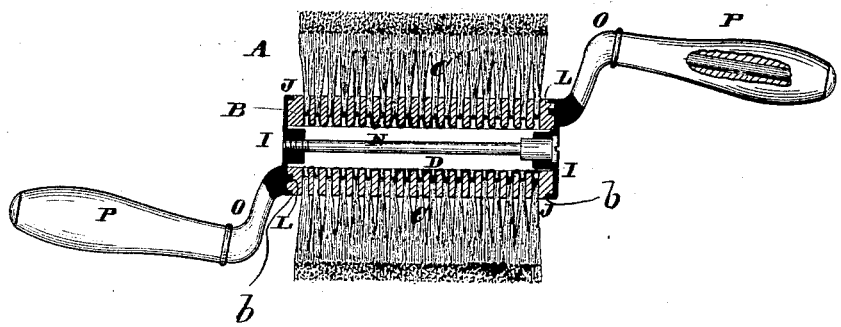
Figure 3:
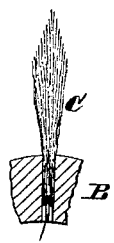

Figure 1 is an elevation of our improved brush. Fig. 2 is a longitudinal section taken on line 2 2, Fig. 1, showing the handles in elevation, a portion of one handle being omitted. Fig. 3 is an enlarged detail view illustrating the form of the tufts.

Our invention relates to improvements in those rotary brushes which are formed with a hollow or cylindrical body, capped ends, and crank-handles; and it consists in features of novelty hereinafter fully described, and pointed out in the claim.

Referring to the drawings, A represents the body of the brush, consisting of a hollow cylinder, B, and tufts C, the cylinder being perforated entirely through its shell to receive the tufts, which are held in the perforations by wires D. Some of the bristles of the tufts are longer than others, as shown, the longer ones serving to open out the hair, thereby giving the shorter ones a chance to brush the scalp and clean it, as well as open the pores.

On each end of the cylinder is a circumferential rabbet, b, which receives a disk, I, each disk having a marginal flange, J, that fits over the end of the cylinder in a rabbet, and each having a teat or projection, L, fitted in a depression in the end of the cylinder to prevent all possibility of the disks turning on the cylinder. The disks are connected by a bolt, N, passing through the hollow cylinder and connecting the disks, as shown in Fig. 2. One of the disks has a socket to receive the head of the bolt, and the other disk has a screw-threaded orifice to receive the screw-threaded end of the bolt.

Formed on the disks are cranks O, provided with hand-pieces P. The cranks are arranged as shown in Fig. 2, and the handle parts are preferably bent inward, as shown, which enables the operator to handle the brush with more ease. The hand-pieces should be loose on the cranks, so as to turn freely thereon and not in the hands of the operator.

The device is used by revolving it over the head, and it very effectually removes dandruff and dirt and opens the pores of the scalp.

We claim as our invention—

A rotary brush comprising a cylindrical body formed with rabbets and depressions in the ends of its shell and provided with tufts of bristles, disks formed with crank-handles and having marginal flanges and teats occupying, respectively, the rabbets and the depressions, and a bolt by which the disks are secured to the cylinder, substantially as set forth.

CONRAD ACKER.
GOTTLOB MICHLER.

In presence of—
GEO. H. KNIGHT,
SAML. KNIGHT.